(12) United States Patent
Li et al.

(10) Patent No.: US 9,226,483 B2
(45) Date of Patent: *Jan. 5, 2016

(54) AQUARIUM WITH WIRELESS POWER TRANSMISSION DEVICE

(71) Applicant: FETON Limited, Taipei (TW)

(72) Inventors: Chih Chun Li, Taipei (TW); Cheng Hsiu Wu, Taipei (TW)

(73) Assignee: FETON LIMITED, Taipei (TW)

( * ) Notice: Subject to any disclaimer, the term of this patent is extended or adjusted under 35 U.S.C. 154(b) by 103 days.

This patent is subject to a terminal disclaimer.

(21) Appl. No.: 13/968,555

(22) Filed: Aug. 16, 2013

(65) Prior Publication Data

US 2014/0102376 A1    Apr. 17, 2014

(30) Foreign Application Priority Data

Aug. 16, 2012 (TW) ............................. 101215822 U
Aug. 16, 2012 (TW) ............................. 101215823 U

(51) Int. Cl.
*A01K 63/00* (2006.01)

(52) U.S. Cl.
CPC ............. *A01K 63/006* (2013.01); *A01K 63/003* (2013.01)

(58) Field of Classification Search
CPC ...... A01K 63/06; A01K 63/003; H01F 38/14; H02J 5/005
USPC ......... 119/247, 245, 246, 253, 254, 255, 256, 119/263, 269; 307/104
See application file for complete search history.

(56) References Cited

U.S. PATENT DOCUMENTS 8,747,075 B1 *   6/2014   Gandini .......................... 417/32
2014/0033984 A1 *   2/2014   Li et al. ......................... 119/247

* cited by examiner

*Primary Examiner* — Trinh Nguyen
(74) *Attorney, Agent, or Firm* — Bacon & Thomas, PLLC

(57) ABSTRACT

An aquarium with wireless power transmission devices, comprising a tank body; a pump which is a wireless power transmission device driven by electrical power, and including an inlet and an outlet; a receiver; and a transmitter including a power source, a resonance transmission driving circuit and a transmitting circuit; wherein the resonance transmission driving circuit converts an electrical power supplied by the power source into an resonating energy; the receiver is disposed within the aquarium and electrically interconnected to the pump, the receiver collects the resonating energy, and the receiver further transfers the resonating energy to the pump; and the fluid worked by the pump enters the pump from the inlet and discharged from the outlet of the pump.

10 Claims, 14 Drawing Sheets

AQUARIUM WITH WIRELESS POWER TRANSMISSION DEVICE

BACKGROUND OF THE INVENTION

1. Technical Field

The present invention relates to an aquarium with wireless power transmission devices and, more particularly, to an aquarium employing wireless power to supply electricity to electric devices.

2. Description of Related Art

The power consumed by a conventional aquarium is generally supplied through a power line or power socket which directs electricity from either the mains electricity system or a power generator to the aquarium. However, such wire-based power distribution is subject to restrictions of the aquarium, and the water in the aquarium may cause damage to the electric devices in the aquarium or present electric leakage hazards, making it inconvenient or even impossible to set up wiring. In order to solve these problems, and based on the requirements of typical aquariums, the present invention provides an improved power transmission means for aquariums used as aquariums or in garden decoration or landscaping.

BRIEF SUMMARY OF THE INVENTION

The present invention relates to an aquarium with wireless power transmission devices, and more particularly to an aquarium with wireless power transmission devices in which electrical energy or power can be readily transferred thereto without a substantial hookup of wire harness. Accordingly, electrical energy can be readily transferred to the aquarium by way of wireless communication.

It is an object of the aquarium with wireless power transmission devices to provide an aquarium in which no need of electrical power harness while the electrical power source can be transferred into the aquarium by way of resonating energy which is transmitted by a transmitter located outside of the aquarium.

It is still an object of the aquarium with wireless power transmission devices to provide an aquarium in which no need of electrical power harness while the electrical power source can be transferred into the aquarium by way of resonating energy, and the aquarium is provided luminous effect, water pump, air pump, and decorations and other electrical devices.

It is still an object of the aquarium with wireless power transmission devices to provide a light fixture in which the electrical power source can be transferred into the light fixture by way of resonating transmitted by wireless communication. The light fixture is an optical device and which can increase an appealing effect and functions.

It is an object of the aquarium with wireless power transmission devices to provide an aquarium in which no need of electrical power harness while the electrical power source can be transferred into the aquarium by way of resonating energy. The provision of the light source generated by the light fixture and the optical device can increase the luminous effects or decorating effect of the aquarium.

To achieve the above and other objects, the present invention discloses an aquarium with wireless power transmission devices, comprising a tank body for containing water therein; a pump which is wireless power transmission device driven by electrical power to work onto fluid, and including an inlet and an outlet; a receiver including a receiving circuit and a rectifying circuit; and a transmitter including a power source, a resonance transmission driving circuit and a transmitting circuit; wherein the transmitter is disposed in a position in which an effective scope of a resonating energy emitted by the transmitter can cover the receiver, the resonance transmission driving circuit converts an electrical power supplied by the power source into an resonating energy which is further transferred through wireless communication; wherein the receiver is disposed within the aquarium and the rectifying circuit is electrically interconnected to the pump, the rectifying circuit of the receiver collects the resonating energy transferred in the form of the wireless electrical power from the transmitter, and the rectifying circuit further transfers the resonating energy to the pump; and the fluid worked by the pump enters the pump from the inlet and discharged from the outlet of the pump.

In the foregoing aquarium with wireless power transmission devices, the transmitter is disposed at one of a bottom, a top and a sidewall of the tank body.

In the foregoing aquarium with wireless power transmission devices, the receiver includes a hollow and waterproof box, and the rectifying circuit of the receiver further includes a waterproof power supplying wire which is electrically terminated to the rectifying circuit at one end, and the other end of the waterproof power harness extends outside of the box and terminated with a connector; wherein the receiving circuit, a receiving coil, and the rectifying circuit of the receiver is disposed within the waterproof box; the one end of the waterproof power supplying wire is electrically to the rectifying circuit, and the other end extends out of the box and electrically terminated to the pump.

In the foregoing aquarium with wireless power transmission devices, the receiver includes a hollow and waterproof box, and the receiving circuit, a receiving coil and a rectifying circuit are disposed within the box; and further includes an light emitting device which is driven by electric power, the light emitting device is electrically interconnected to the rectifying circuit of the receiver, and powered by the same, the light emitting device is disposed within the box, and electrically interconnected to the rectifying circuit of the receiver, the box includes a transparent portion which is inline with the light emitting device; wherein the waterproof box of the receiver includes an upper half and a lower half which embodied in the form of housing, the upper half is water tightly engaged with the lower half so as to configure the waterproof box.

In the foregoing aquarium with wireless power transmission devices, the box further includes a post which is a tubular configuration with a closed end atop, the transparent portion of the box is formed by the post which is inline with the light emitting device.

In the foregoing aquarium with wireless power transmission devices, the box further includes an internal compartment which is located between the upper half and lower half and has a hollow configuration with a through-hole post which extends from a top of the internal compartment and inline with the transparent portion of the upper half, the light emitting device of a passive device and the receiver are disposed within the internal compartment, a light beam from the light emitting device projects out of the transparent portion upper half through through-hole post.

In the foregoing aquarium with wireless power transmission devices, the invention further comprises an optical device which includes a second transparent portion which is translucent to light and is disposed on the box, the second transparent portion is a transparent configuration made from transparent material formed on a portion of the optical device, the second transparent portion is inline with the transparent portion of the box; wherein the optical device further includes a second connecting portion and the second transparent portion is inline with the transparent portion of the box, the second transparent portion is mechanically coupled to the post of the box, and the mechanic coupling between the post and the second connecting portion is a separable interconnection.

In the foregoing aquarium with wireless power transmission devices, the transparent portion of the box is disposed in the post, and the second transparent portion of the optical device is disposed onto the second connecting portion; wherein the post is formed on top of the box and the transparent portion is formed in the post and inline with the light emitting device; the second connecting portion further includes a connecting recess which is inline with the post and further engages with the post, the recess is defined in a bottom of the optical device, the second transparent portion is formed on top of the second connecting device; and the light emitting device is disposed within the post.

In the foregoing aquarium with wireless power transmission devices, the optical device further includes a receiving slot which is a recessed configuration on top of the optical device, and the second connecting portion is disposed on a bottom of the optical device.

In the foregoing aquarium with wireless power transmission devices, the receiver includes a hollow and waterproof box which further includes an inlet connector and an outlet connector, the receiving circuit, a receiving coil, and the rectifying circuit are disposed within the box; and the pump is further disposed within the box; wherein the inlet and outlet are extending from the pump to a surface thereof, and further coupled to the inlet connector and outlet connector of the box.

In the foregoing aquarium with wireless power transmission devices, the inlet connector and the outlet connector are tubular hose configuration formed on the surface of the box, and in communication with the inlet connector and the outlet connector.

In the foregoing aquarium with wireless power transmission devices, the tank body further includes a reservoir with the receiver disposed within reservoir; wherein further including an air duct and the pump is an air pump to blow air, the air duct is a hose with one end interconnected to the inlet of the pump and the other end extends beyond a water surface of the tank body and in communication with the air.

In the foregoing aquarium with wireless power transmission devices, the tank body further includes a reservoir and the receiver is disposed within the reservoir; wherein the rectifying circuit further includes a waterproof power supplying wire which is a power supplying wire and electrically terminated to the rectifying circuit at one end, and the other end of the waterproof power harness extends outside of the box and terminated with a connector.

In the foregoing aquarium with wireless power transmission devices, the invention further comprises a filter and a conduit and the pump is a water pump, one end of the conduit is coupled to the out of the pump and the other end is coupled to the filter.

In the foregoing aquarium with wireless power transmission devices, the hollow and waterproof box of the receiver is formed in the tank body, and the transmitter is formed in the bottom of the tank body.

In the foregoing aquarium with wireless power transmission devices, the invention further comprises a member having an inlet and a vent which are in communication with outside of the member, the inlet of the member is in communication with the vent, and the other end is coupled to the outlet of the pump.

In the foregoing aquarium with wireless power transmission devices, the member includes an upper portion and a lower portion, and the upper portion is pivotally attached to a rear end of the lower portion such that the upper portion can be pivotally rotated with respect to the lower portion; the inlet and vent of the member are disposed on the lower portion, and the vent is formed on a top surface of the lower portion and directs toward the upper portion.

In the foregoing aquarium with wireless power transmission devices, the invention further comprises an light emitting device which is driven by electric power, the light emitting device is electrically interconnected to the rectifying circuit of the receiver, and powered by the same; the receiver includes a hollow and waterproof box, and the light emitting device is disposed within the waterproof box, the box includes a transparent portion which is inline with the light emitting device; and wherein the box further includes a post which is a tubular configuration with a closed end atop, the transparent portion of the box is formed by the post which is inline with the light emitting device; wherein the member is fixedly disposed onto the box of the receiver, and the post of the box passes through the member, and the member and the post of the box are engaged with each other.

In the foregoing aquarium with wireless power transmission devices, the box further includes an inlet connector and an outlet connector, the receiving circuit, a receiving coil, and the rectifying circuit are disposed within the box; and the pump is further disposed within the box; wherein the inlet and outlet are extending from the pump to a surface thereof, and further coupled to the inlet connector and outlet connector of the box; and the inlet of the member is in communication to the vent of the member, and the other end of the inlet is coupled to the outlet connector of the box and further coupled to the outlet of the pump.

In the foregoing aquarium with wireless power transmission devices, the invention further comprises a member having an inlet, a vent, a turbine and a rotator; wherein the inlet and the vent are tubular configuration in communication with each other, and the inlet extends out of the member and coupled to the outlet of the pump; and the turbine and the rotor is pivotally disposed onto the member and the turbine and the rotor are configured into a corresponding mechanism, the turbine is inline with the vent, and the turbine is rotated by the current vented form the vent, and the rotor is rotated by the rotation of the turbine.

In order for a better understanding of the present invention to the skilled in the art in view of its purposes, characteristic features and functions, detailed descriptions in view of preferred embodiments along with the drawings are given elaborately here below.

BRIEF DESCRIPTION OF THE SEVERAL VIEWS OF THE DRAWINGS

The objects as well as the technical features and effects of the present invention will be best understood by referring to the following detailed description of some illustrative embodiments and the accompanying drawings, in which.

DETAILED DESCRIPTION OF THE INVENTION

In order to provide a better understanding to the present invention, preferred embodiments have been provided to explain the invention.

Figure 1:
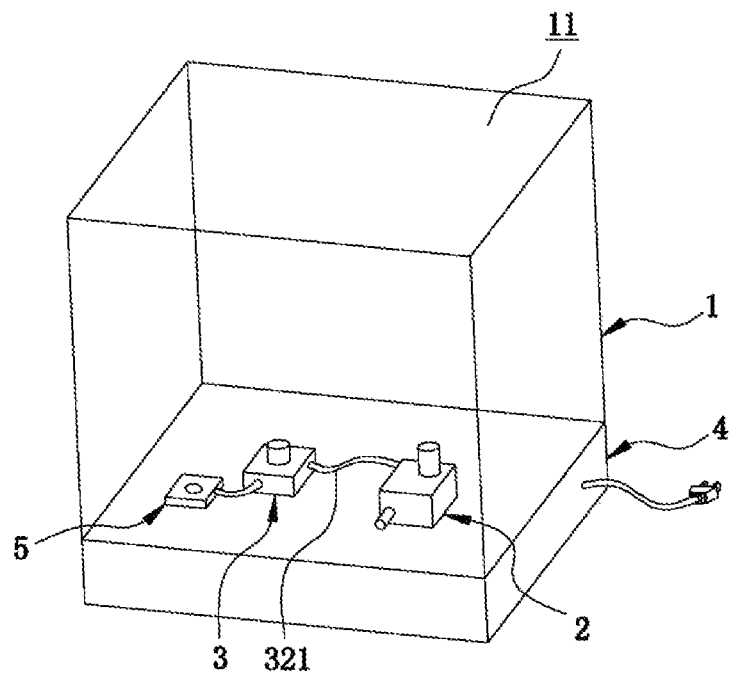
FIG. 1 is a perspective view of a first embodiment of an aquarium with wireless power transmission devices made in according with the present invention.
Figure 2:
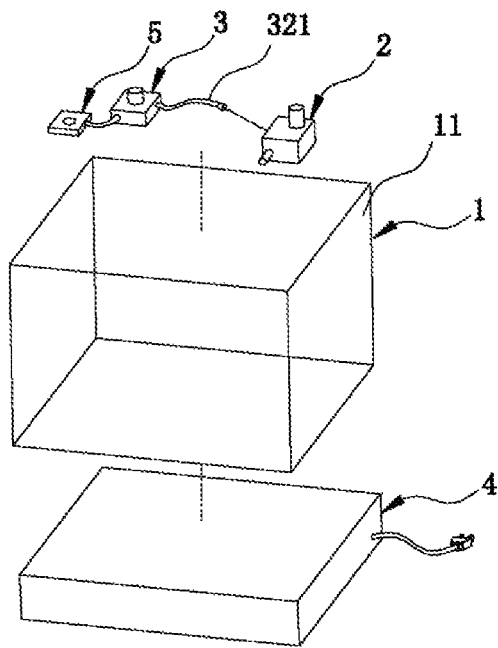
FIG. 2 is an exploded view of the first embodiment shown in FIG. 1.
Figure 3:
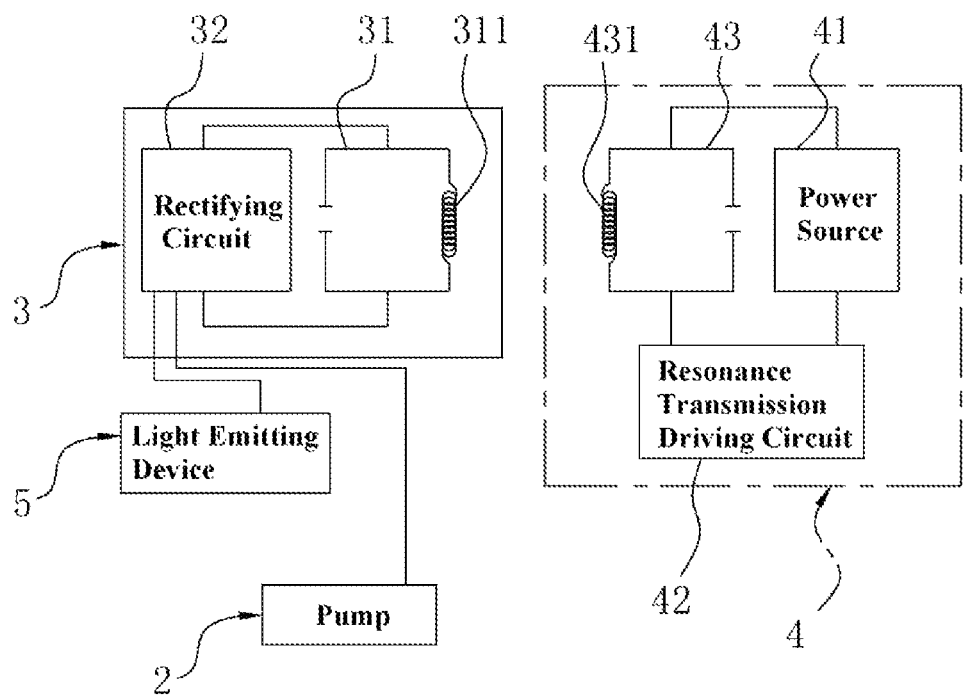
FIG. 3 is a flow chart diagram showing the relationship between the electrical devices.

The present invention is related to an aquarium with wireless power transmission devices in which electrical power can be readily transferred thereto by way of resonating characteristic of electrical signal such that the electrical device can be operated by such electrical power transferred. FIG. 1 is a perspective view of a first embodiment of an aquarium with wireless power transmission devices made in according with the present invention; FIG. 2 is an exploded view of the first embodiment shown in FIG. 1; and FIG. 3 is a flow chart diagram showing the relationship between the electrical devices. Referring to FIGS. 1, 2 and 3, the aquarium with wireless power transmission devices includes a tank body 1, a pump 2, a receiver 3 and a transmitter 4. The tank body 1 is a container in which water mass can be held therein; the pump 2 is electric device driven by electrical power and works onto fluid so as to increase the pressure of the fluid, gaseous or liquid states, so as to drive the fluid to flow around; the receiver 3 is a wireless power transmission device which can receive the resonating energy transferred through the wireless communication and further convert the resonating energy into electrical power, and is electrically connected to the pump 2 which in turn powered by the receiver 3; and the transmitter 4 is a wireless power transmission devices and which is incorporated with the receiver 3 to convert the electrical power into resonating energy and further transfer the resonating energy through the wireless communication. When the receiver 3 is located within the effective covering scope of the resonating energy of the transmitter 4, the receiver 3 can collect the resonating energy and further convert it into electrical power.

In the embodiment mentioned above, the aquarium with wireless power transmission devices made in accordance with the present invention includes a light emitting device 5 which is an optical device driven by electrical power. The light-emitting device 5 is electrically connected to the receiver 3 which supplies the electrical power needed by the light-emitting device 5.

Referring to FIG. 3 again, the receiver 3 further includes a receiving circuit 31, and a rectifying circuit 32. The receiving circuit 31 includes a resonating circuit in the form of a receiving coil 311. The transmitter 4 mentioned above further includes a power source 41, a resonance transmission driving circuit 42, and a transmitting circuit 43. The power source 41 is a power supply providing the electrical power needed by the transmitter 4. The resonance transmission driving circuit 42 is a regulating circuit for electrical signals, and making portion of the electrical power from the power source 41 being converted into electrical signal and delivered to the transmitting circuit 43. The transmitting circuit 43 includes at least a transmitting coil 431, and which receives the electrical signals from the resonance transmission driving circuit 42 and further converts the electrical signals into resonating energy, and further send it out. Wherein the receiving circuit 31 is made to corresponding to the transmitting circuit 43 of the transmitter 4, and further receives the resonating signals from the transmitting coil 431 of the transmitting circuit 43, and then converts it into an electrical power output. The rectifying circuit 32 is a regulating circuit regulating and converting the power output from the receiving circuit 31 needed for the pump 2, the light emitting device 5, and then delivers to the pump 2 and the light emitting device 5 in the form of electrical power.

Accordingly, in the configuration of the aquarium with wireless power transmission devices made in accordance with the present invention, when the power source 41 supplies the electrical power needed by the transmitter 4, the resonance transmission driving circuit 42 will make partial of the electrical power from the power source 41 being converted into the electrical signal and then delivers it to the transmitting circuit 43. The transmitting coil 431 of the transmitting circuit 43 can convert the electrical signal from the resonance transmission driving circuit 42 into resonating energy and then send it to the receiver 3. The rectifying circuit 32 will convert the power output from the receiving circuit 31 needed for the pump 2, the light emitting device 5, and then delivers to the pump 2 and the light emitting device 5 in the form of electrical power for them to use. Wherein the receiver 3 is disposed within the tank body 1 and within the effective scope of the resonating energy of the transmitter 4 such that the receiver 3 can collect the resonating energy transmitted from the transmitter 4.

In the embodiment discussed above, the tank body 1 further includes a reservoir 11 which is a hollow configuration within the tank body 1 for storing water, and the receiver 3 can be disposed within the reservoir 11 of the tank body 1. The receiver 3 can be selectively arranged to be fixedly disposed within the reservoir 11 or removeably disposed within the reservoir 11.

The transmitter 4 described above can be disposed on a bottom, a top, and a sidewall of the tank body 1, and in an area adjacent to the tank body 1 as long as the transmitter 4 provides the effective scope of the resonating energy which covers the receiver 3 such that the receiver 3 can readily receive the resonating energy from the transmitter 4. Wherein, selectively, the power source 41 of the transmitter 4 can be a power harness of alternative current (AC), and the power source 41 extends outwardly so as to interconnect to an outlet/receptacle from a wall. By this arrangement, the alternative power source from the wall can be also used to power the transmitter 4 for its operation.

Figure 4:
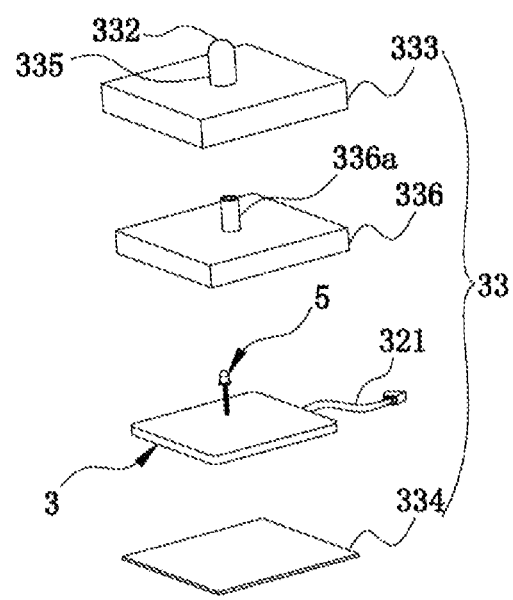
FIG. 4 is a perspective and exploded and partial view of an component of aquarium with wireless power transmission devices made in accordance with the present invention.
Figure 5:
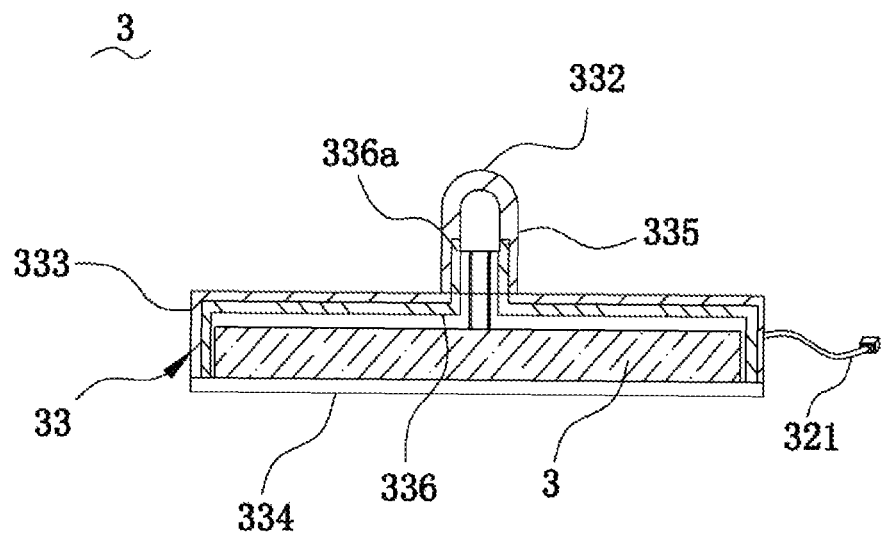
FIG. 5 is a cross sectional view of the component shown in FIG. 4.

FIG. 4 is a perspective and exploded and partial view of an component of the aquarium with wireless power transmission devices made in accordance with the present invention; and FIG. 5 is a cross sectional view of the component shown in FIG. 4. Referring to FIGS. 4 and 5, and again with FIGS. 1, 2 and 3, in the aquarium with wireless power transmission devices made in accordance with the present invention, the receiver 3 includes a hollow box 33, and the rectifying circuit 32 further includes a waterproof power harness 321 which is made from electrical wire with one end terminated to the rectifying circuit 32 of the receiver 3, and the other end extends out of the box 33 and terminated into a connector. The receiving circuit 31, the receiving coil 311 and the rectifying circuit 32 of the receiver 3 are disposed within the box 33. One end of the waterproof power harness 321 is terminated to the rectifying circuit 32 of the transmitter 3 and the other end extends through the box 33 and electrically connected to the pump 2. By this arrangement, when the receiver 3 is disposed within the reservoir 11 of the tank body 1, and located within the effective scope of the coverage of the resonating energy, the receiver 3 can collect the resonating energy and then converts it into electrical power for the use of the pump 2. Further, the box 33 can be further configured into a waterproof configuration so as to prevent water damage of the electrical functions of the receive 3 by the water from the tank body 1.

In the embodiment discussed above, the light-emitting device 5 is disposed within the box 33 and electrically connected to the rectifying circuit 32 of the receiver 3. The box 33 is provided with a transparent portion 332 which is made from transparent material and is located inline with the light-emitting device 5. By this arrangement, when the electrical power is supplied to the light emitting device 5 from the rectifying circuit 32 of the receiver 3, the light beam generated by the light emitting device 5 will pass through the transparent portion 332 and reaches out of the box 33 for being used as an illumination or light source for decorating. In addition, the watertight configuration of the box 33 can readily protect the light-emitting device 5 from water damage caused by the water from the tank body 1.

Referring again to FIGS. 4 and 5, in the embodiment described above, the box 33 of the receiver 3 can further include an upper half 333 and a lower half 334. Both the upper half 333 and the lower half 334 are shells, and the upper half 333 is waterproofly attached to a top of the lower half 334 so as to configure the box 33. Wherein the box 33 is a waterproof configuration so as to protect the components within the box 33. The key point of the present invention is not aimed to the technology of waterproof, and the technologies of waterproof are directed to the prior arts, such as using the waterproof glue to adhere the upper and lower halves 333 and 334, or by way of ultrasonic welding to waterproofly combine the upper and lower halves 333 and 334 so as to achieve the waterproof result.

In the embodiment mentioned above, the light emitting device 5 is disposed within the box 33, and the transparent portion 332 is formed on top of the upper half 333. The transparent portion 332 is made from transparent material and located inline with the light-emitting device 5.

In the above-described embodiment of the aquarium with wireless power transmission devices made in accordance with the present invention, the box 33 further includes a post 335 which is a hollow and tubular configuration with a closed end at top. The transparent portion 332 of the box 33 is formed on the post 335 which is inline with the light-emitting device 5. By this arrangement, the light beam from the light-emitting device 5 can pass through the transparent portion 332 and reaches out of the box 33.

In the configuration of the aquarium with wireless power transmission devices made in accordance with the present invention, the box 33 further includes an inner compartment 336 which is disposed between the upper and lower halves 333 and 334, and which is a hollow configuration of a through-hole post 336a. The through-hole post 336a is a tubular configuration extends upward from the internal compartment 336 and inline with the transparent portion 332 of the upper half 333. The light emitting device 5 and the receiver 3 are disposed within the internal compartment 336. The light beam from the light emitting device 5 can readily pass through the through-hole post 336a and then reaches out of the upper half 333 through the transparent portion 332.

Figure 6:
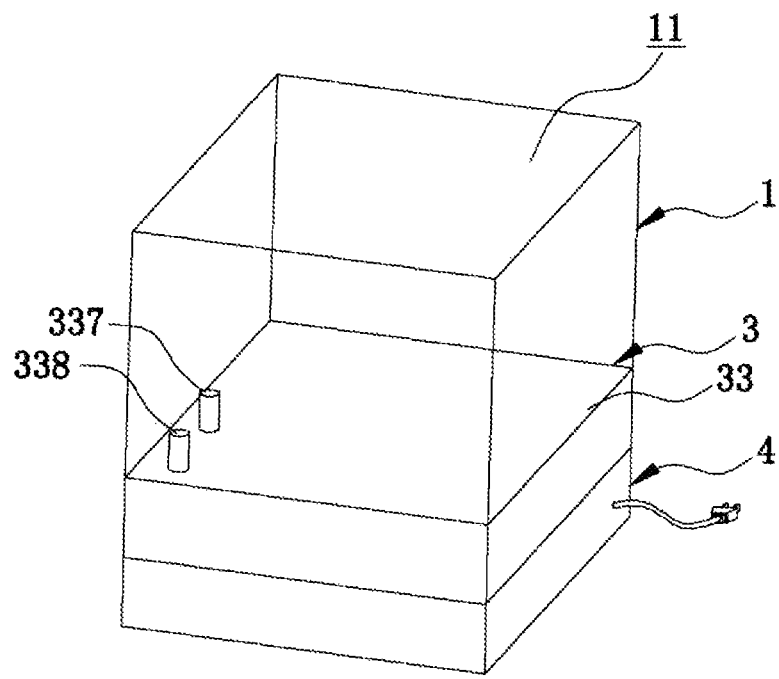
FIG. 6 is an assembled and perspective view of the aquarium with wireless power transmission devices made in accordance with the present invention.
Figure 7A:
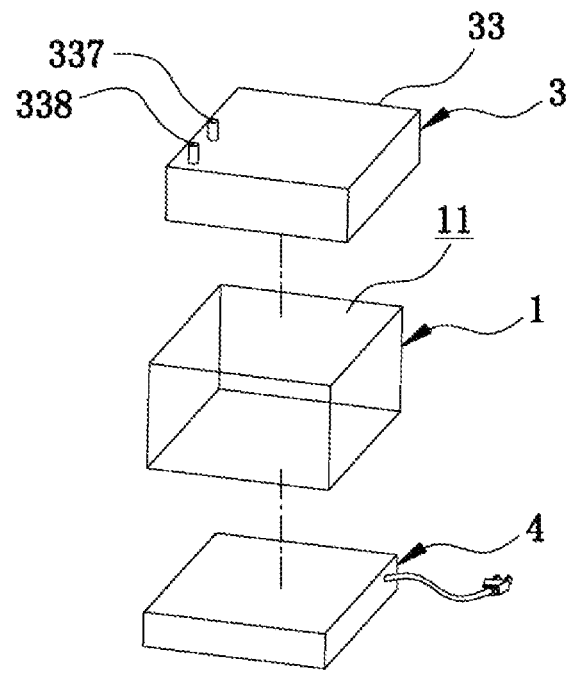
FIG. 7A is a perspective and exploded view of FIG. 6.
Figure 7B:
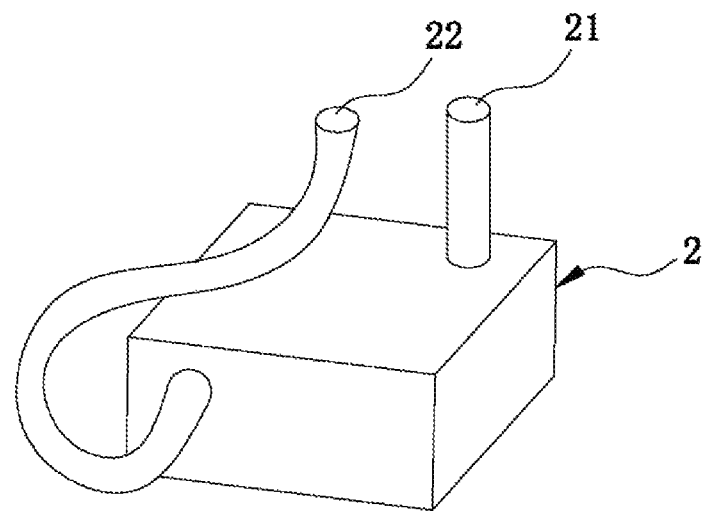
FIG. 7B is a perspective view of a partial component of FIG. 6.

FIG. 6 is an assembled and perspective view of the aquarium with wireless power transmission devices made in accordance with the present invention; FIG. 7A is a perspective and exploded view of FIG. 6; and FIG. 7B is a perspective view of a partial component of FIG. 6. Referring to FIGS. 6, 7A and 7B, and again referring also to FIG. 3, in the configuration of the aquarium with wireless power transmission devices made in accordance with the present invention, the pump 2 is further disposed within the box 33 of the receiver 3, and which includes an inlet 21 and an outlet 22. The box 33 further includes an inlet connector 337 and an outlet connector 338. Wherein the inlet 21 and the outlet 22 are the fluid inlet and outlet of the pump 2, and the inlet 21 and the outlet 22 extend from the pump 2 to a surface of the box 33 and further coupled to the inlet connector 337 and the outlet connector 338 of the box 33. By this arrangement, when the fluid is worked by the pump 2, the fluid can enter the inlet 21 of the pump 2 from the inlet connector 337, and then discharged from the outlet connector 338 of the box 33 through the outlet of the 22 of the pump 2.

Regarding the box 33 of the above-described embodiment, the inlet connector 337 and the outlet connector 338 are embodied as a hose formed onto the surface of the box 33, and respectively coupled to the inlet connector 337 and the outlet connector 338. Accordingly, the inlet connector 337 and the outlet connector 338 provide the necessary pipelines necessary for the connection so as to meet the requirements of the pipeline for water or air of the tank body 1.

Referring to FIG. 6 again, and in the aquarium with wireless power transmission devices made in accordance with the present invention, the box 33 of the receiver 3 is disposed within the reservoir 11 of the tank body 1.

Figure 8:
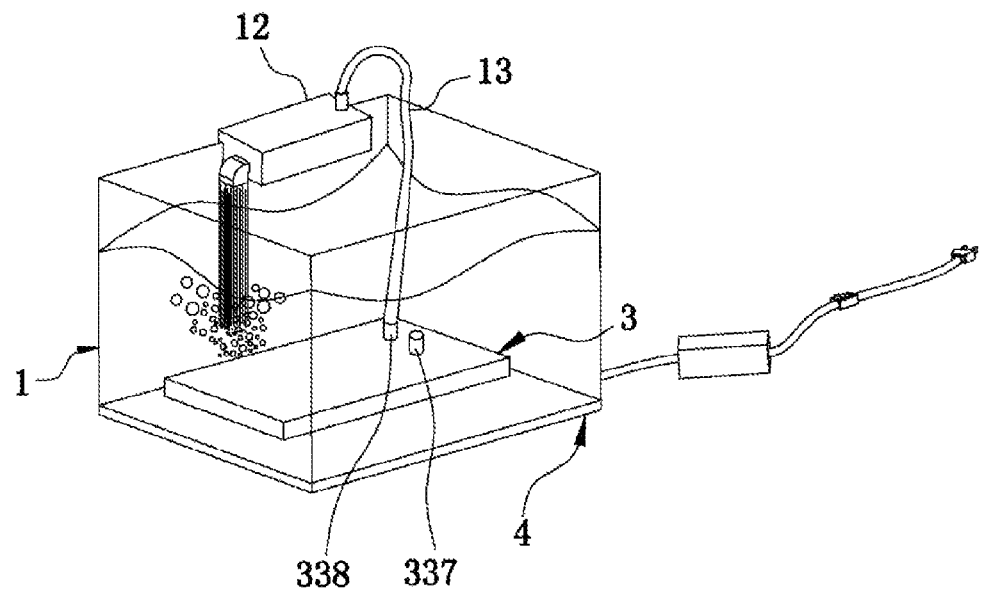
FIG. 8 is an assembled and perspective view of the aquarium with wireless power transmission devices made in accordance with the present invention.

FIG. 8 is an assembled and perspective view of the aquarium with wireless power transmission devices made in accordance with the present invention. Referring to FIG. 8 along with FIGS. 6, 7A, and 7B. In the configuration of the aquarium with wireless power transmission devices made in accordance with the present invention, it further includes a filter 12 and a conduit 13 and the pump 2 is a water pump to pump the water to flow around. The conduit 13 is a hose with one end coupled to the outlet 22 of the pump 2 through the outlet connector 338, and the other end is coupled to the filter 12. By this arrangement, the pump 2 can suck in the water of the tank body 1 from the outlet connector 338 into the inlet 21 of the pump 2, and further discharged through the outlet 22 of the pump 2, and further sends to the filter 12 through the conduit 13. By this arrangement, the water within the tank body 1 can be readily filtered.

Figure 9:
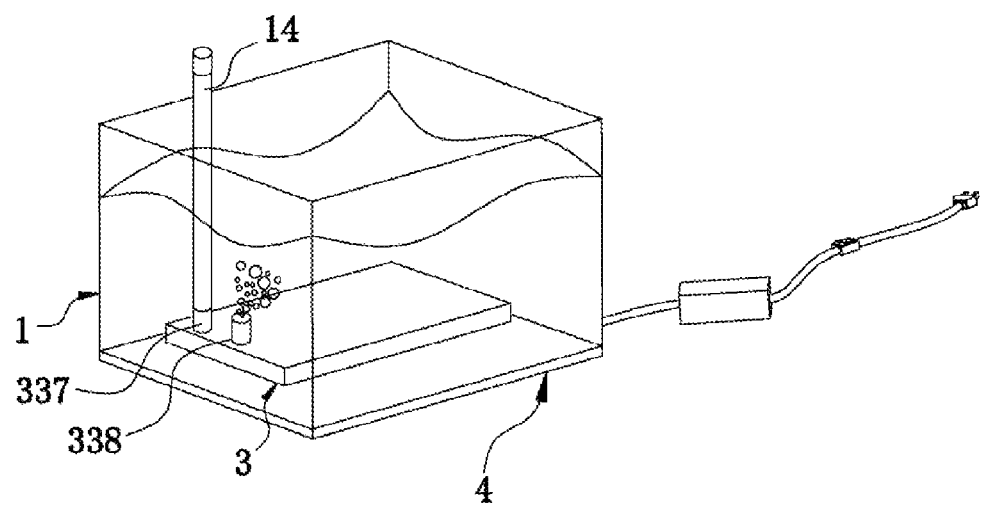
FIG. 9 is an assembled and perspective view of the aquarium with wireless power transmission devices made in accordance with the present invention.

FIG. 9 is an assembled and perspective view of the aquarium with wireless power transmission devices made in accordance with the present invention. Referring to FIG. 9 and again referring to FIGS. 6 and 7. In the aquarium with wireless power transmission devices made in accordance with the present invention, further includes an air duct 14, and the pump 2 is an air pump for blowing airflow. The air duct 14 is a hose, and one end of the air duct 14 is coupled to the inlet connector 337 and then to the inlet 21 of the pump 2, and the other end extends over a water surface of the tank body 1 to reach to the air. By this arrangement, the pump 2 can suck in airflow from the air duct 14. The air sucked into the pump 2 is then discharged from the outlet 22 of the pump 2, and then flows into the tank body 1 through the outlet connector 338.

Figure 10:
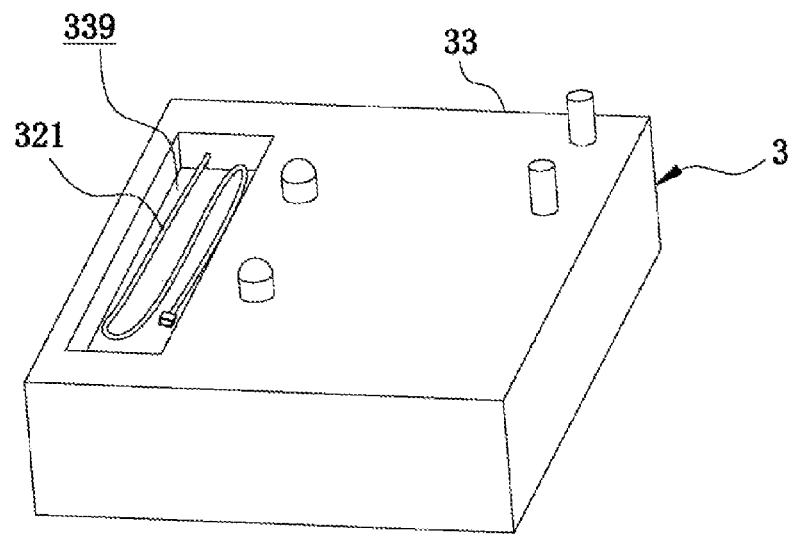
FIG. 10 is an assembled and perspective view of a partial component of the aquarium with wireless power transmission devices made in accordance with the present invention.
Figure 11:
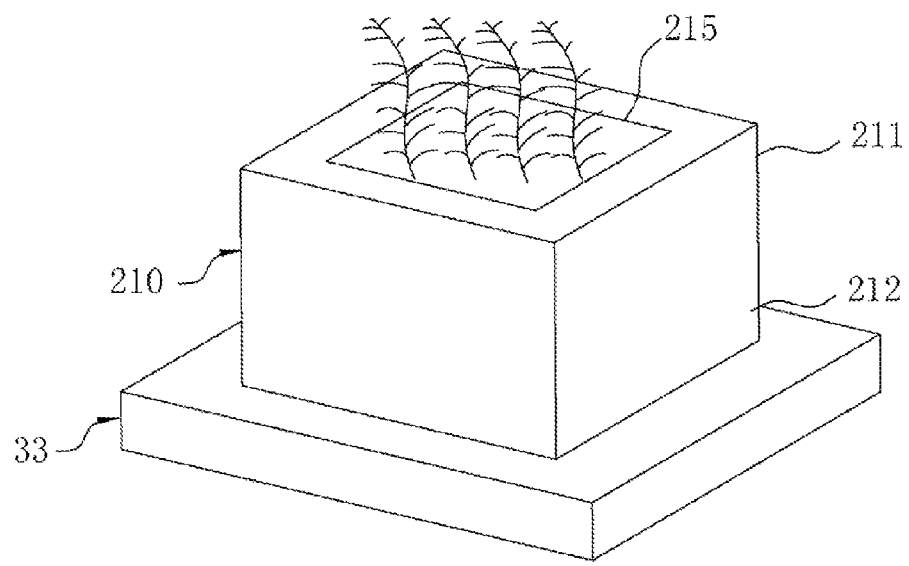
FIG. 11 is a perspective and exploded view of FIG. 10.

FIG. 10 is an assembled and perspective view of a partial component of the aquarium with wireless power transmission devices made in accordance with the present invention; and FIG. 11 is a perspective and exploded view of FIG. 10. Referring to FIGS. 10 and 11, and further to FIGS. 6 and 7, in the aquarium with wireless power transmission devices made in accordance with the present invention, the power harness 321 of the box 33 can be reserved for the use of other electrical device optionally installed therein. Accordingly, the waterproof power harness 321 can be used for extended electrical device connected externally, for example, an additional water pump or air pump for the tank body 1 normally used therein.

Furthermore, the box 33 can be further defined with harness grooves 339 which are recessed grooves on the surface of the box 33. The waterproof power harness 321 extends outward from the harness grooves 339 which can completely embrace the power harness 321. Accordingly, when the waterproof power harness 321 is not in use, then it can be readily stored within the harness groove 339.

Figure 12:
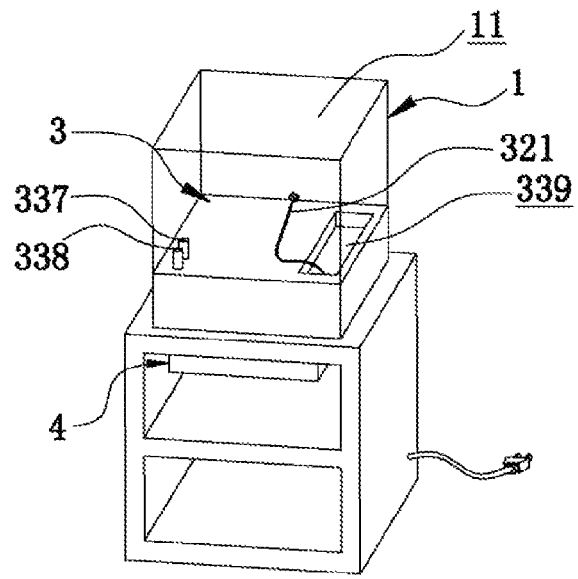
FIG. 12 is an assembled and perspective view of a partial component of the aquarium with wireless power transmission devices made in accordance with the present invention.

FIG. 12 is an assembled and perspective view of a partial component of the aquarium with wireless power transmission devices made in accordance with the present invention. Referring to FIG. 12, in the aquarium with wireless power transmission devices made in accordance with the present invention, the box 33 of the receiver 3 can be readily formed into a component of the tank body 1.

In the preferred embodiment of the present invention, the box 33 of the receiver 3 is formed in to a component of the bottom of the tank body 1.

Furthermore, in the aquarium with wireless power transmission devices made in accordance with the present invention, further includes a storing compartment 300. A top of the storing compartment 300 can be used to dispose on the bottom of the tank body 1, and used to dispose the transmitter 4. Wherein, the power source 41 of the transmitter 4 can extend out of the storing compartment 300 from inside out so as to readily interconnect the power source 41 of the transmitter 4 to the external power source.

Figure 13:
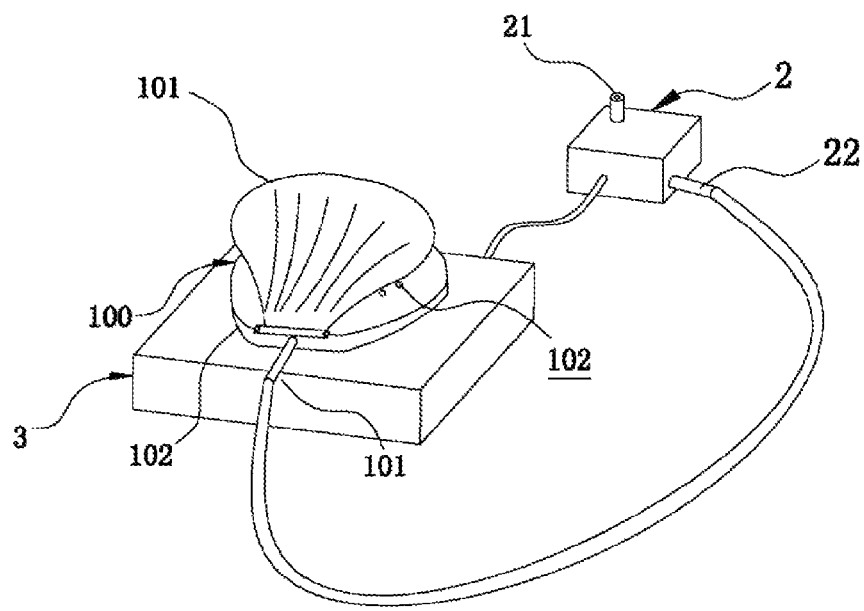
FIG. 13 is an assembled and perspective view of a tank body of the aquarium with wireless power transmission devices made in accordance with the present invention.
Figure 14:
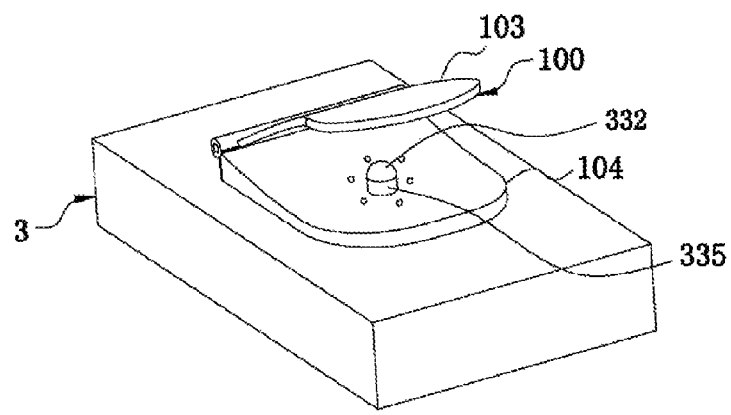
FIG. 14 is an assembled and perspective view of a partial component taking from different angle thereof.
Figure 15:
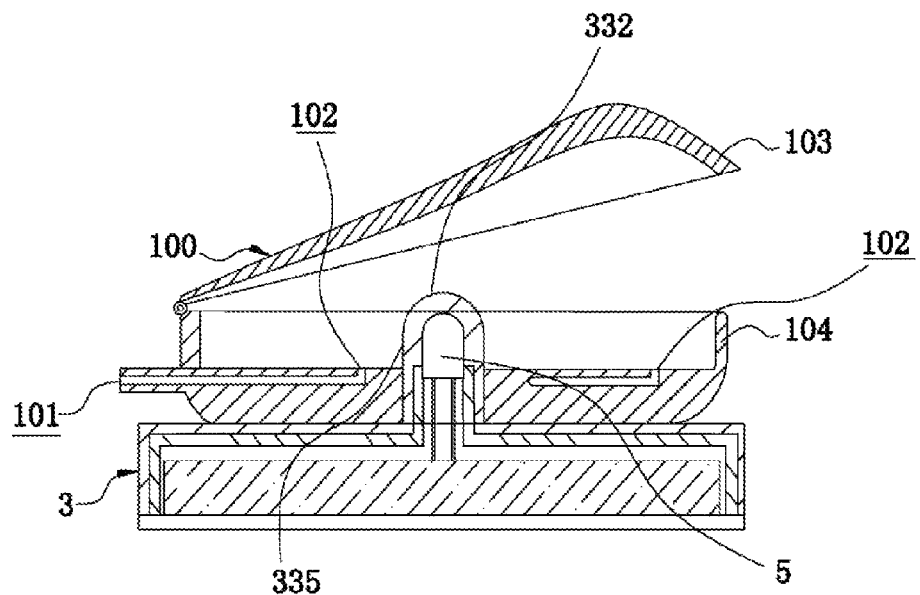
FIG. 15 is a cross sectional view of the component shown in FIG. 14.

FIG. 13 is an assembled and perspective view of a tank body of the aquarium with wireless power transmission devices made in accordance with the present invention. FIG. 14 is an assembled and perspective view of a partial component taking from different angle thereof; and FIG. 15 is a cross sectional view of the component shown in FIG. 14. Referring to FIGS. 13, 14 and 15, the aquarium with wireless power transmission devices made in accordance with the present invention further includes a member 100 having an inlet 101 and a vent 102. Both of the inlet 101 and the vent 102 are coupled to external of the member 100. One end of the inlet 101 is in communication to the vent 102 of the member 100, and the other end couples to the outlet 22 of the pump 2. Accordingly, the fluid driven by the pump 2 can be delivered from the outlet 22 of the pump 2 into the inlet 101 of the member 100, and then shot out from the vent 102 of the member 100.

In the embodiment described above, the member 100 can be a decoration, and the fluid driven by the pump 2 can be water or air. Accordingly, the member 100 can shot out airflow or bubbles so as to create an appealing effect.

In the embodiment described above, the member 100 further includes an upper portion 103 and a lower portion 104 on which the upper portion 103 is pivotally mounted thereto. By this arrangement, the upper portion 103 can pivotally move with respect to the lower portion 104. The inlet 101 and the vent 102 of the member 100 can be formed onto the lower portion 104, and the vent 102 is formed onto a top surface of the lower portion 104, and then faces toward the upper portion 103. By this arrangement, when the water flow or air bubbles from the pump 2 is released from the vent 102 through the inlet 101 of the member 100, the water flow or air bubbles will create a force to drive the upper portion 103 randomly such that the upper portion 103 will move upward and downward randomly in accordance with the movement of the water flow or air bubbles.

In the embodiment described above, the light-emitting device 5 can be disposed within the box 33 of the receiver 3, and the box 33 has a tubular post 335 in which the transparent portion 332 is formed thereon. The tubular post 335 is inline with the light-emitting device 5 such that the light beam from the light-emitting device 5 can pass through the tubular post 335 and reach out of the box 33 through the transparent portion 332. Wherein the member 100 is fixedly attached to the box 33 of the receiver 3 and inline with the light-emitting device 5. In addition, based on the embodiment shown in FIG. 4, the member 100 can be securely attached to the box 33 of the receiver 3, and the tubular post 335 of the box 33 passes through the member 100 so as to create an inter engagement between the member 100 and the tubular post 335 of the box 33.

Figure 16:
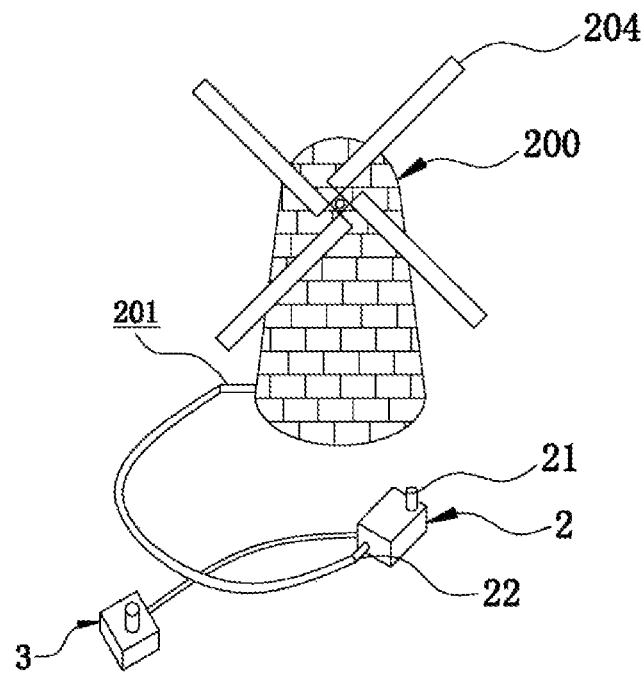
FIG. 16 is an assembled and perspective view of a tank body of the aquarium with wireless power transmission devices made in accordance with the present invention.
Figure 17:
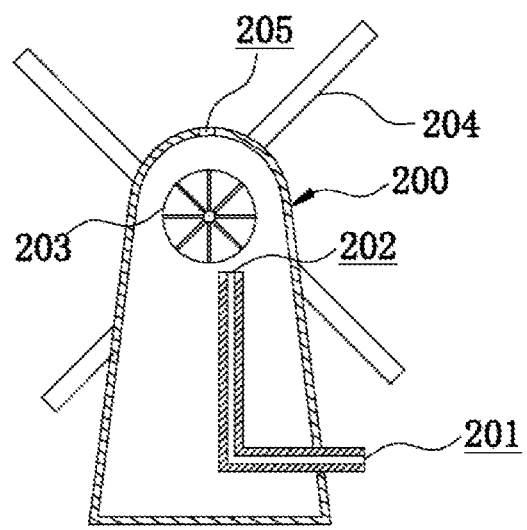
FIG. 17 is a transversal cross sectional view of a component shown in FIG. 16.
Figure 18:
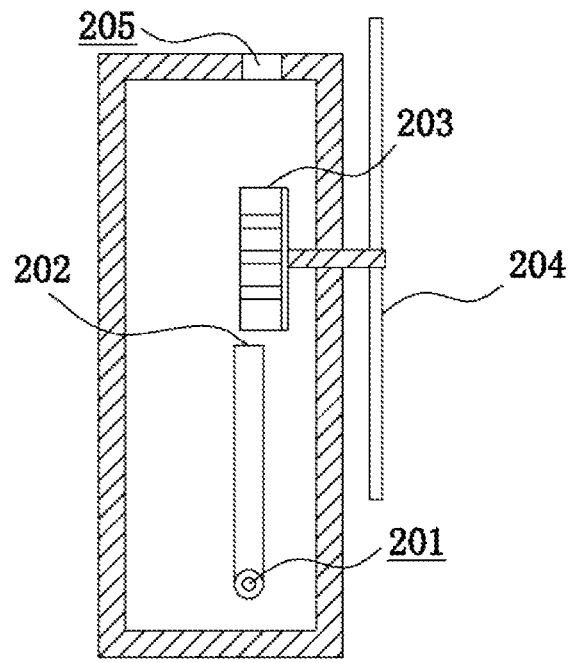
FIG. 18 is a longitudinal cross sectional view of a component shown in FIG. 16.

FIG. 16 is an assembled and perspective view of a tank body of the aquarium with wireless power transmission devices made in accordance with the present invention. FIG. 17 is a transversal cross sectional view of a component shown in FIG. 16; and FIG. 18 is a longitudinal cross sectional view of a component shown in FIG. 16. Referring to FIGS. 16, 17 and 18, the aquarium with wireless power transmission devices made in accordance with the present invention includes further a member 200 having an inlet 201, a vent 202, a turbine 203 and a rotor 204. Wherein the inlet 201 and the vent 202 are in communication with each other, and the inlet 201 is in communication with outward of the member 200 and coupled to the outlet 22 of the pump 2. The turbine 203 and the rotor 204 are pivotally mounted onto the member 200, and the turbine 203 and the rotor 24 are coupled together. The turbine 203 is inline with the vent 202 such that the turbine 203 and the rotor 204 can rotate with respect to the member 200. The turbine 203 is driven by the water flow of air bubbles from the vent 202, and then the rotor 204 is rotated by the turbine 203. Accordingly, the fluid driven by the pump 2 will be discharged to the inlet 201 of the member 200 from the outlet 22 of the pump 2, and then discharged from the vent 202 of the member 200, and further driving the turbine 203 to rotate.

In the embodiment described above, the turbine 203 and the rotor 204 are linked together, and this can be facilitated by mounting both the turbine 203 and the rotor 204 onto a common axis which is in turn securely attached to the member 200.

In the embodiment described above, the turbine 203 and the rotor 204 are linked together, and this can be facilitated by providing a meshed coupling between the turbine 203 and the rotor 204 or by way of linkage.

In the embodiment mentioned above, the turbine 203 is disposed within the member 200, and the rotor 204 is disposed externally of the member 200. The member 200 further includes an opening 205 which is defined locally of the member 200. When the water flow or air bubbles from the vent 202 of the member 200 drive the turbine 203 to rotate, the water flow or air bubbles will be released from the opening 205 so as to further release the pressure built-up within the member 200.

Figure 19:
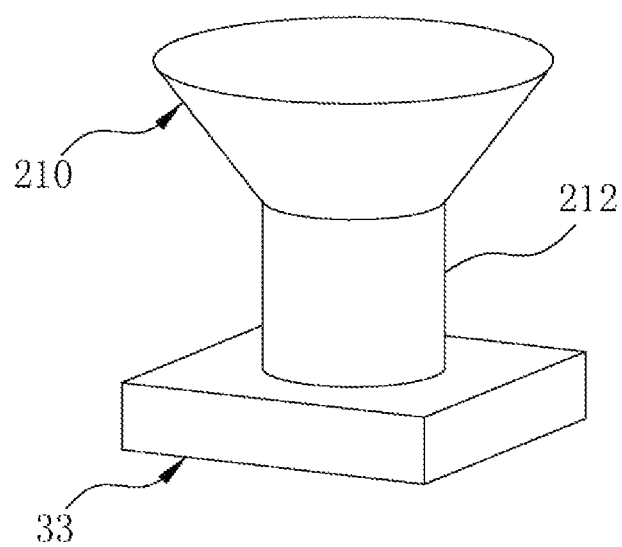
FIG. 19 is an assembled and perspective view of a component of a tank body of the aquarium with wireless power transmission devices made in accordance with the present invention.
Figure 20:
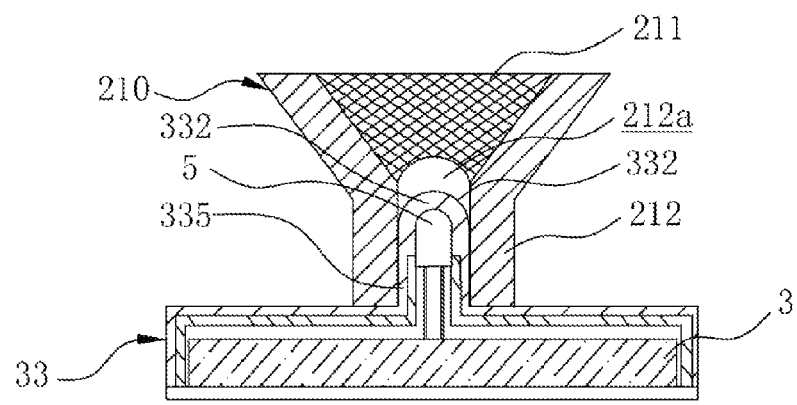
FIG. 20 is a cross sectional view of the component shown in FIG. 19.

FIG. 19 is an assembled and perspective view of a component of a tank body of the aquarium with wireless power transmission devices made in accordance with the present invention. FIG. 20 is a cross sectional view of the component shown in FIG. 19. Referring to FIGS. 19 and 20, in the aquarium with wireless power transmission devices made in accordance with the present invention, further includes an optical device 210 which is a device having partially transparent. The optical device 210 is detachably mounted onto the box 33 inline with the light-emitting device 5.

The optical device 210 further includes a second transparent portion 211 and a second connecting portion 212. The second transparent portion 211 is made from transparent material and arranged locally on the optical device 210. The second transparent portion 211 is inline with the transparent portion 332 of the box 33. The second connecting portion 212 is mechanically coupled to the tubular post 335 of the box 33. Accordingly, when the tubular post 335 and the second connecting portion 212 are mechanically coupled, the light beam projected from the light emitting device 5 will pass through the transparent portion 332 and then through the second transparent portion 211. The optical device 210 and the box 33 are securely engaged.

In the aquarium with wireless power transmission devices made in accordance with the present invention, the transparent portion 332 of the box 33 is disposed on the tubular post 335 and the second transparent portion 211 of the optical device 210 is disposed onto the second connecting portion 212. Accordingly, when the tubular post 335 and the second connecting portion 212 are mechanically coupled, the transparent portion 332 is inline with the second transparent portion 211.

In the above-described embodiment, the second connecting portion 212 further includes a connecting recess 212a which is corresponding to the tubular post 335 and capable of meshing with the tubular post 335 so as to create a base of the optical device 210. The second transparent portion 211 is formed on top of the second connecting portion 212. Accordingly, when the connecting recess 212a of the second connecting portion 212 envelops onto the tubular post 335 and further creates a mechanic coupling, the optical device 210 can securely disposed on top of the box 33. The transparent portion 332 of the tubular post 335 will inline with the second transparent portion 211 located on top of the connecting recess 212a, and by this arrangement, the light beam from the light emitting device 5 will pass through the transparent portion 332 and further projects out of the second transparent portion 211.

Referring to FIGS. 19 and 20, in the optical device 210, the second transparent portion 211 forms a focusing optical configuration. Accordingly, the light beam from the light-emitting device 5 of the box 33 projects out of the second transparent portion 211 from the transparent portion 332, the light beam will be focused and creates a spot light effect.

On the other hand, in the above-described optical device 210, the second transparent portion 211 can also be embodied with a diffusion structure. Accordingly, the light beam from the light emitting device 5 of the box 33 emits from the second transparent portion 211, the light beam will be diffused by the optical device 210 to create an appealing effect.

In the embodiment described above, the second transparent portion 211 of the optical device 210 can be embodied into a lens so as to reach a converging or diverging optical effect.

In the embodiment described above, the second transparent portion 211 of the optical device 210 can be embodied as a through hole in which the light beam can directly pass through.

In the embodiment described above, the optical device 210 can be made directly from a transparent material.

In the aquarium with wireless power transmission devices made in accordance with the present invention, the receiver 3 is disposed within the box 33 and further electrically connected to the light-emitting device 5 such that the output power from the receiver 3 can be supplied to the light-emitting device 5 for its operation.

The light emitting device 5 described above can be configured by a light emitting diode and the light-emitting device 5 is disposed within the tubular post 335.

Figure 21:
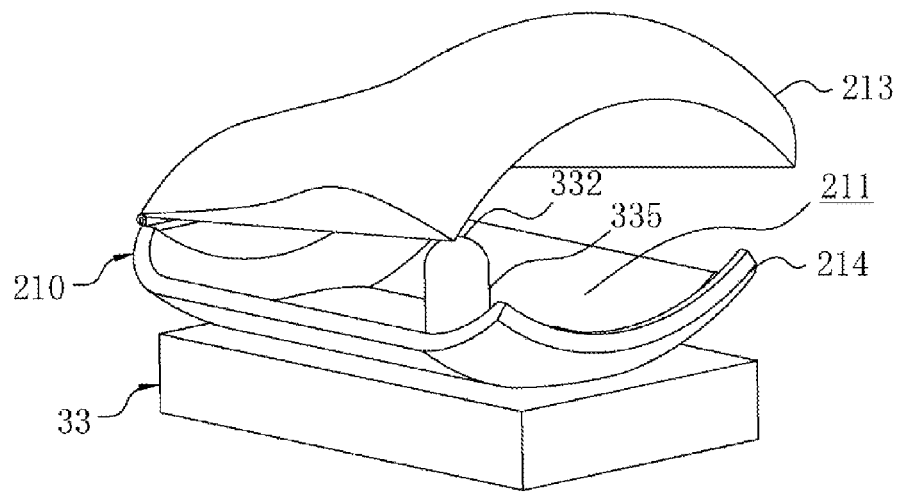
FIG. 21 is an assembled and perspective view of a component of a tank body of the aquarium with wireless power transmission devices made in accordance with the present invention.
Figure 22:
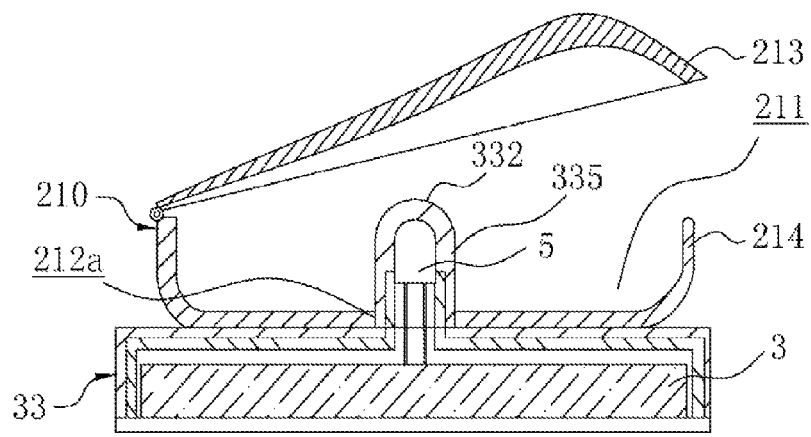
FIG. 22 is a cross sectional view of the component shown in FIG. 21.

FIG. 21 is an assembled and perspective view of a component of a tank body of the aquarium with wireless power transmission devices made in accordance with the present invention; and FIG. 22 is a cross sectional view of the component shown in FIG. 21. Referring to FIGS. 21 and 22, in the aquarium with wireless power transmission devices made in accordance with the present invention, the optical device 210 further configures with a first element 213 and a second element 214. The connecting recess 212a is defined on a bottom of the second element 214, and the first element 213 and the second element 214 jointly configure a mussel configuration.

The first element 213 and the second element 214 are configured into a mussel with a predetermined opened angle.

The second transparent portion 211 of the optical device 210 is created by a space between the first element 213 and the second element 214.

The first element 213 and the second element 214 of the optical device 210 are made from transparent material and configure the second transparent portion 211.

In addition, the first element 213 and the second element 214 can be pivotally engaged with each other such that a pivotal movement between the first element 213 and the second element 214 is allowed so as to make an adjustment of the opened angle between the first element 213 and the second element 214.

Figure 23:
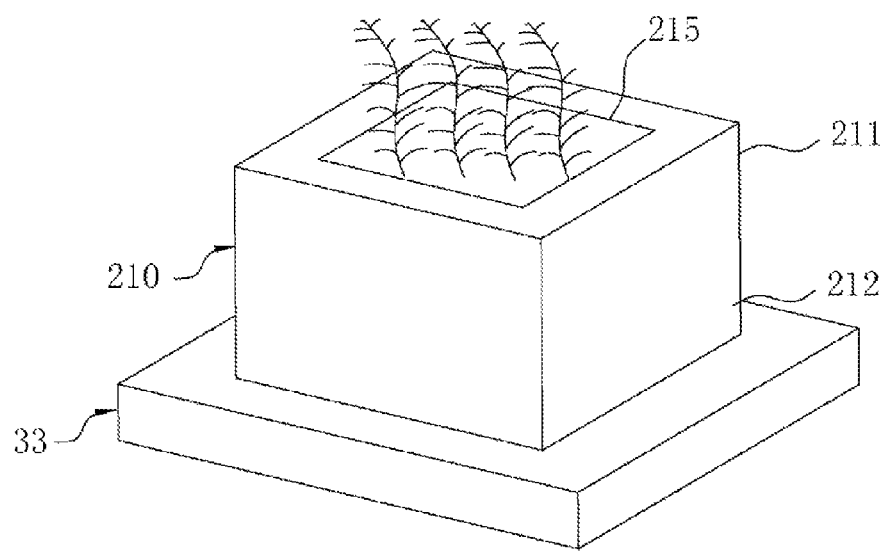
FIG. 23 is an assembled and perspective view of a component of a tank body of the aquarium with wireless power transmission devices made in accordance with the present invention.
Figure 24:
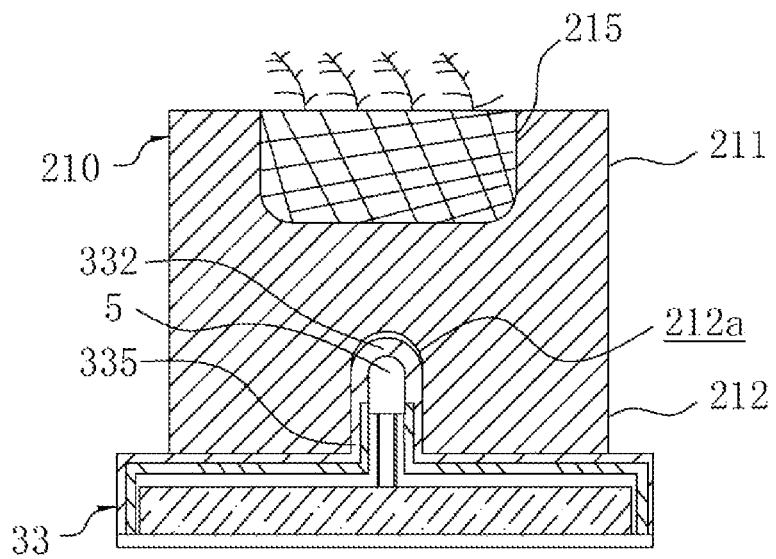
FIG. 24 is a cross sectional view of the element shown in FIG. 23 in assembled manner.

FIG. 23 is an assembled and perspective view of a component of a tank body of the aquarium with wireless power transmission devices made in accordance with the present invention; and FIG. 24 is a cross sectional view of the element shown in FIG. 23 in assembled manner Referring to FIGS. 23 and 24, in the aquarium with wireless power transmission devices made in accordance with the present invention, based on the second transparent portion 211 of the above described optical device 210, the optical device 210 further includes a receiving slot 215 which is a recessed configuration on top of the optical device 210, and the second connecting portion 212 is formed on a bottom of the optical device 210. Accordingly, the receiving slot 215 located on top of the optical device 210 can be used to hold an aquarium plant or decoration. Then the connecting recess 212a of the second connecting portion 212 of the optical device 210 is coupled with the tubular post 335 of the box 33, the light beam from the light emitting device 5 of the box 33 will pass through the second transparent portion 211 of the optical device 210 and reaches outwardly.

Figure 25:
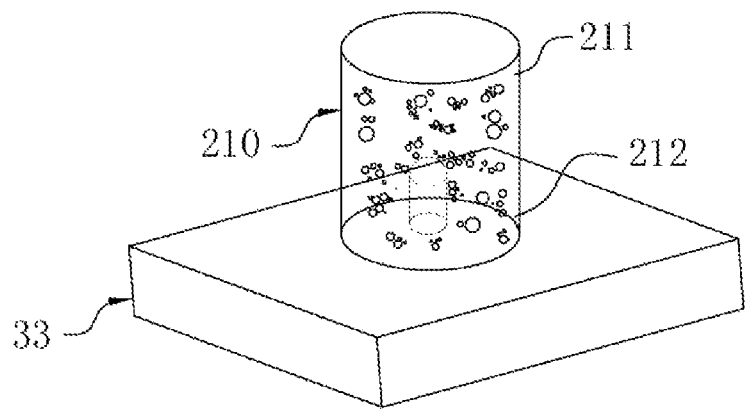
FIG. 25 is an assembled and perspective view of a component of a tank body of the aquarium with wireless power transmission devices made in accordance with the present invention.
Figure 26:
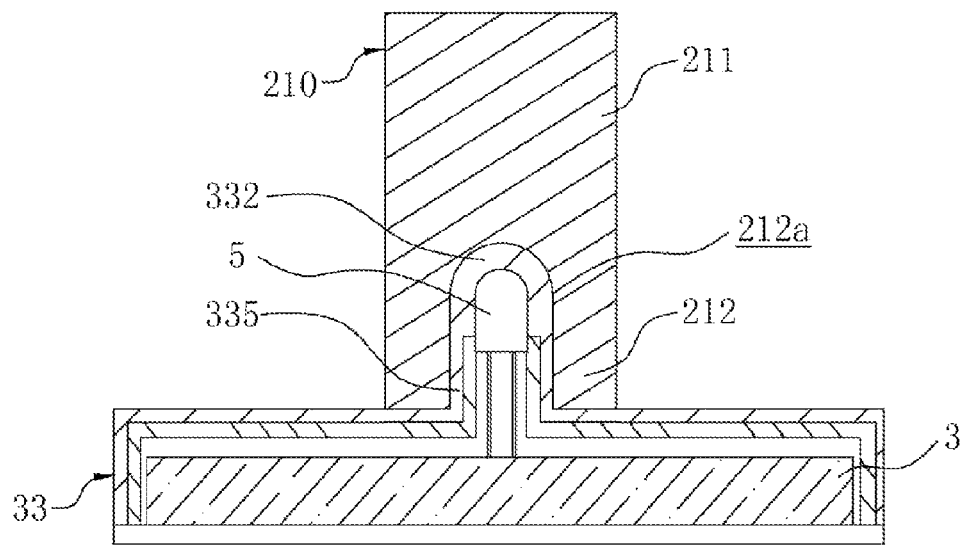
FIG. 26 is a cross sectional view of the element shown in FIG. 25 in assembled manner.

FIG. 25 is an assembled and perspective view of a component of a tank body of the aquarium with wireless power transmission devices made in accordance with the present invention; and FIG. 26 is a cross sectional view of the element shown in FIG. 25 in assembled manner. Referring to FIGS. 25 and 26, in the aquarium with wireless power transmission devices made in accordance with the present invention, the optical device 210 is made from transparent material and forms the second transparent portion 211 accordingly. The connecting recess 212a of the second connecting portion 212 is formed on a bottom of the optical device 210. Accordingly, when the connecting recess 212a of the second connecting portion 212 of the optical device 210 is coupled with the tubular post 335 of the box 33, the light beam from the light emitting device 5 of the box 33 will pass through the second transparent portion 211 of the optical device 210 and reaches outwardly. Wherein the optical device 210 can be implemented into appealing creatures, such as animals, geometrical shapes. Accordingly, when the light beams projects from the optical device 210 of the light-emitting device 5, the optical device 210 will become luminous so as to generate an appealing effect for the optical device 210.

In the aquarium with wireless power transmission devices made in accordance with present invention, both the receiver 3 and the transmitter 4 of different embodiments meet the requirements and protocols Qi of the Wireless Power Consortium.

In light of this, the present invention provides the aquarium with wireless power transmission devices and provides with detailed descriptions to different embodiments. However, the above described are merely preferred embodiments while should not be construed as the limitation of the implementation of the present invention. Any modifications and alternations made therefrom in view of the spirit of the present invention should be covered by the appended claims.

What is claimed is:

1. An aquarium equipped with wireless power transmission devices, comprising
a tank body for containing water therein;
a pump which is a wireless power transmission device driven by electrical power to work onto fluid, and including an inlet and an outlet;
a receiver including a receiving circuit and a rectifying circuit; and
a transmitter including a power source, a resonance transmission driving circuit and a transmitting circuit;
wherein the transmitter is disposed in a position in which an effective scope of a resonating energy emitted by the transmitter can cover the receiver, the resonance transmission driving circuit converts an electrical power supplied by the power source into an resonating energy which is further transferred through wireless communication; wherein the receiver is disposed within the aquarium and the rectifying circuit is electrically interconnected to the pump, the receiving circuit of the receiver collects the resonating energy transferred in the form of the wireless electrical power from the transmitter, and the rectifying circuit further transfers the resonating energy to the pump; and the fluid worked by the pump enters the pump from the inlet and discharged from the outlet of the pump;
wherein the receiver includes a hollow and waterproof box which further includes an inlet connector and an outlet connector, the receiving circuit, a receiving coil, and the rectifying circuit are disposed within the box; and the pump is further disposed within the box; wherein the inlet and outlet are extending from the pump to a surface thereof, and further coupled to the inlet connector and outlet connector of the box.

2. The aquarium equipped with wireless power transmission devices as recited in claim 1, wherein the inlet connector and the outlet connector are tubular hose configuration formed on the surface of the box, and in communication with the inlet connector and the outlet connector.

3. The aquarium equipped with wireless power transmission devices as recited in claim 2, wherein the tank body further includes a reservoir with the receiver disposed within reservoir; wherein the pump further including an air duct and the pump is an air pump to blow air, the air duct is a hose with one end interconnected to the inlet of the pump and the other end extends beyond a water surface of the tank body and in communication with the air.

4. The aquarium equipped with wireless power transmission devices as recited in claim 2, wherein the tank body further includes a reservoir and the receiver is disposed within the reservoir; wherein the rectifying circuit further includes a waterproof power supplying wire which is a power supplying wire and electrically terminated to the rectifying circuit at one end, and the other end of the waterproof power harness extends outside of the box and terminated with a connector.

5. The aquarium equipped with wireless power transmission devices as recited in claim 1, further comprising a filter and a conduit and the pump is a water pump, one end of the conduit is coupled to the out of the pump and the other end is coupled to the filter.

6. The aquarium equipped with wireless power transmission devices as recited in claim 1, the hollow and waterproof box of the receiver is formed in the tank body, and the transmitter is formed in the bottom of the tank body.

7. An aquarium equipped with wireless power transmission devices, comprising
- a tank body for containing water therein;
- a pump which is a wireless power transmission device driven by electrical power to work onto fluid, and including an inlet and an outlet;
- a receiver including a receiving circuit and a rectifying circuit; and
- a transmitter including a power source, a resonance transmission driving circuit and a transmitting circuit; and
- a member having an inlet and a vent which are in communication with outside of the member, the inlet of the member is in communication with the vent, and the other end is coupled to the outlet of the pump;
- wherein the transmitter is disposed in a position in which an effective scope of a resonating energy emitted by the transmitter can cover the receiver, the resonance transmission driving circuit converts an electrical power supplied by the power source into an resonating energy which is further transferred through wireless communication; wherein the receiver is disposed within the aquarium and the rectifying circuit is electrically interconnected to the pump, the receiving circuit of the receiver collects the resonating energy transferred in the form of the wireless electrical power from the transmitter, and the rectifying circuit further transfers the resonating energy to the pump; and the fluid worked by the pump enters the pump from the inlet and discharged from the outlet of the pump; wherein the member includes an upper portion and a lower portion, and the upper portion is pivotally attached to a rear end of the lower portion such that the upper portion can be pivotally rotated with respect to the lower portion; the inlet and vent of the member are disposed on the lower portion, and the vent is formed on a top surface of the lower portion and directs toward the upper portion.

8. The aquarium equipped with wireless power transmission devices as recited in claim 7, wherein further includes an light emitting device which is driven by electric power, the light emitting device is electrically interconnected to the rectifying circuit of the receiver, and powered by the same; the receiver includes a hollow and waterproof box, and the light emitting device is disposed within the waterproof box, the box includes a transparent portion which is inline with the light emitting device; and wherein the box further includes a post which is a tubular configuration with a closed end atop, the transparent portion of the box is formed by the post which is inline with the light emitting device; wherein the member is fixedly disposed onto the box of the receiver, and the post of the box passes through the member, and the member and the post of the box are engaged with each other.

9. The aquarium equipped with wireless power transmission devices as recited in claim 8, wherein the box further includes an inlet connector and an outlet connector, the receiving circuit, a receiving coil, and the rectifying circuit are disposed within the box; and the pump is further disposed within the box; wherein the inlet and outlet are extending from the pump to a surface thereof, and further coupled to the inlet connector and outlet connector of the box; and the inlet of the member is in communication to the vent of the member, and the other end of the inlet is coupled to the outlet connector of the box and further coupled to the outlet of the pump.

10. An aquarium equipped with wireless power transmission devices, comprising
- a tank body for containing water therein;
- a pump which is a wireless power transmission device driven by electrical power to work onto fluid, and including an inlet and an outlet;
- a receiver including a receiving circuit and a rectifying circuit; and
- a transmitter including a power source, a resonance transmission driving circuit and a transmitting circuit; and
- a member having an inlet, a vent, a turbine and a rotator;
- wherein the transmitter is disposed in a position in which an effective scope of a resonating energy emitted by the transmitter can cover the receiver, the resonance transmission driving circuit converts an electrical power supplied by the power source into an resonating energy which is further transferred through wireless communication; wherein the receiver is disposed within the aquarium and the rectifying circuit is electrically interconnected to the pump, the receiving circuit of the receiver collects the resonating energy transferred in the form of the wireless electrical power from the transmitter, and the rectifying circuit further transfers the resonating energy to the pump; and the fluid worked by the pump enters the pump from the inlet and discharged from the outlet of the pump;
- wherein the inlet and the vent are tubular configuration in communication with each other, and the inlet extends out of the member and coupled to the outlet of the pump; and the turbine and the rotor is pivotally disposed onto the member and the turbine and the rotor are configured into a corresponding mechanism, the turbine is inline with the vent, and the turbine is rotated by the current vented form the vent, and the rotor is rotated by the rotation of the turbine.

* * * * *